(12) United States Patent
Sanyal et al.

(10) Patent No.: US 11,193,834 B2
(45) Date of Patent: Dec. 7, 2021

(54) ELECTROMAGNETIC RADIATION POWER AND IRRADIANCE MEASUREMENT DEVICE AND METHODS

(71) Applicant: The United States of America, as represented by the Secretary of the Navy, Crane, IN (US)

(72) Inventors: Subrata Sanyal, Eastvale, CA (US); Joseph A. Fiordilino, Corona, CA (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 77 days.

(21) Appl. No.: 16/898,694

(22) Filed: Jun. 11, 2020

(65) Prior Publication Data

US 2021/0190597 A1    Jun. 24, 2021

Related U.S. Application Data

(60) Provisional application No. 62/860,026, filed on Jun. 11, 2019.

(51) Int. Cl.
*G01J 5/34* (2006.01)

(52) U.S. Cl.
CPC .......... *G01J 5/34* (2013.01); *G01J 2005/345* (2013.01)

(58) Field of Classification Search
CPC ............................ G01J 5/34; G01J 2005/345
See application file for complete search history.

(56) References Cited

U.S. PATENT DOCUMENTS

| 7,064,908 | B2 | 6/2006 | Cipra | |
|---|---|---|---|---|
| 2002/0145102 | A1 | 10/2002 | Eckelkamp-Baker et al. | |
| 2008/0283751 | A1* | 11/2008 | Kymissis | G01J 5/34 |
| | | | | 250/338.3 |
| 2012/0161003 | A1* | 6/2012 | Tsuchiya | G01J 5/024 |
| | | | | 250/338.3 |
| 2019/0137335 | A1 | 5/2019 | Fiordilino et al. | |

FOREIGN PATENT DOCUMENTS

FR    20110049328    3/2011

* cited by examiner

*Primary Examiner* — David P Porta
*Assistant Examiner* — Fani Boosalis
(74) *Attorney, Agent, or Firm* — Naval Surface Warfare Center, Crane Division; Eric VanWiltenburg

(57) ABSTRACT

The present invention relates to a system for measuring the power of electromagnetic radiation (EMR) using piezoelectric transducers (PZTs) and pyroelectric transducers (PRTs). According to an illustrative embodiment of the present disclosure, a target cell has a mirrored surface that can partially reflect and partially absorb EMR. Each target cell can include or be coupled to PZTs and PRTs. When incident EMR reflects off of targets cells, the reflected portion creates radiation pressure and the non-reflected portions creates heat. The PZTs convert the pressure into a first electric current, and the PRTs convert the heat into a second electric current. Measuring the first and/or second currents allows a user to calculate the original power of an EMR source. By utilizing multiple target cells placed in specially designed arrays, a user can calculate fluctuations of EMR power by time and location across the target cells.

11 Claims, 7 Drawing Sheets

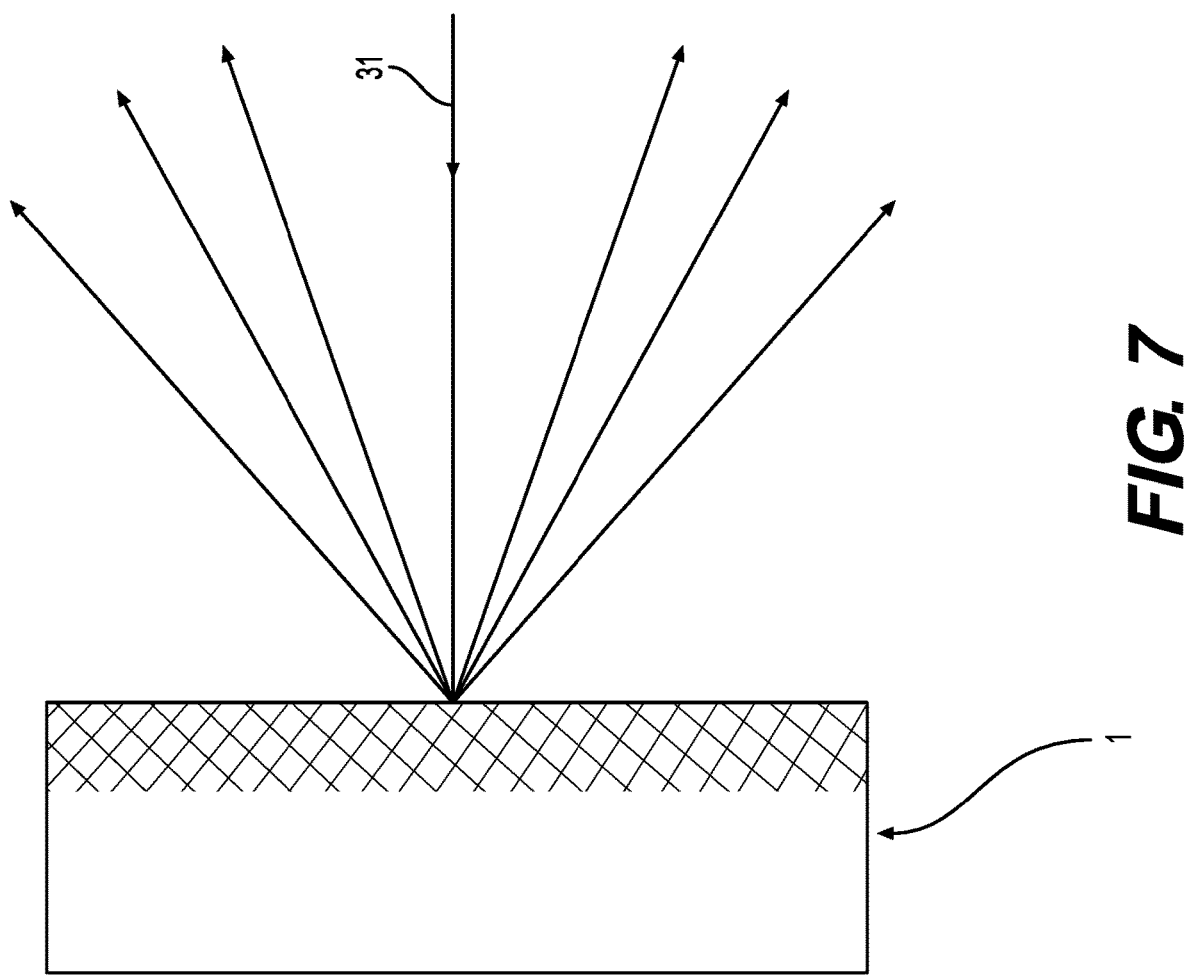

ELECTROMAGNETIC RADIATION POWER AND IRRADIANCE MEASUREMENT DEVICE AND METHODS

CROSS REFERENCE TO RELATED APPLICATIONS

This application claims priority under 35 U.S.C. 119(e) of U.S. provisional patent application Ser. No. 62/860,026 filed on Jun. 11, 2019 entitled Electromagnetic Radiation Power and Irradiance Measurement Device and Methods the disclosure of which is hereby incorporated herein by reference.

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon. This invention (Navy Case 200,624) is assigned to the United States Government and is available for licensing for commercial purposes. Licensing and technical inquiries may be directed to the Technology Transfer Office, Naval Surface Warfare Center, Corona Division, email: CRNA_CT0@navy.mil.

FIELD OF THE INVENTION

The present invention relates to systems for measuring electromagnetic radiation using radiation pressure and heat transfer from partially reflected beams.

BACKGROUND AND SUMMARY OF THE INVENTION

The present invention relates to a system for measuring the power of electromagnetic radiation (EMR) using piezoelectric transducers (PZTs) and pyroelectric transducers (PRTs). It is difficult to measure the power of high energy EMR sources because the EMR is too energetic for most sensors to record without degrading or being damaged. To fill the gap of non-availability of improved sensors capable of operating under very high temperatures, a system capable of measuring high energy EMR without suffering damage or degradation is needed.

According to an illustrative embodiment of the present disclosure, a target cell has a mirrored surface that can partially reflect and partially absorb EMR. Each target cell can include or be coupled to PZTs and PRTs. When incident EMR reflects off of targets cells, the reflected portion generates radiation pressure and the non-reflected portions creates heat. The PZTs convert the pressure into a first electric current, and the PRTs convert the heat into a second electric current. Measuring the first and/or second electric currents and the knowledge of the reflection/absorption coefficients of the partially reflecting/absorbing mirrors (dependent on the selected materials) allow a user to calculate the original power of an incident EMR.

According to a further illustrative embodiment of the present disclosure, an array of target cells are embedded within a target board. Different designs of arrays could be utilized, e.g., square array, honeycomb array, circular array, etc. for optimizing the spatial coverage of the target board with the target cells and optimizing the inter-cell separation on the board. For an EMR incident on such a target board that covers multiple target cells of this array on the target board, a user can calculate fluctuations of the incident EMR power by time and location across the target board. This, in turn, allows calculation of the irradiance/intensity profile (both spatial and temporal), total intensity/irradiance, radius, and the total optical power of the EMR beam incident on the target board.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:
FIGS. 6 and 7 show reflectance configurations for an exemplary target cell.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
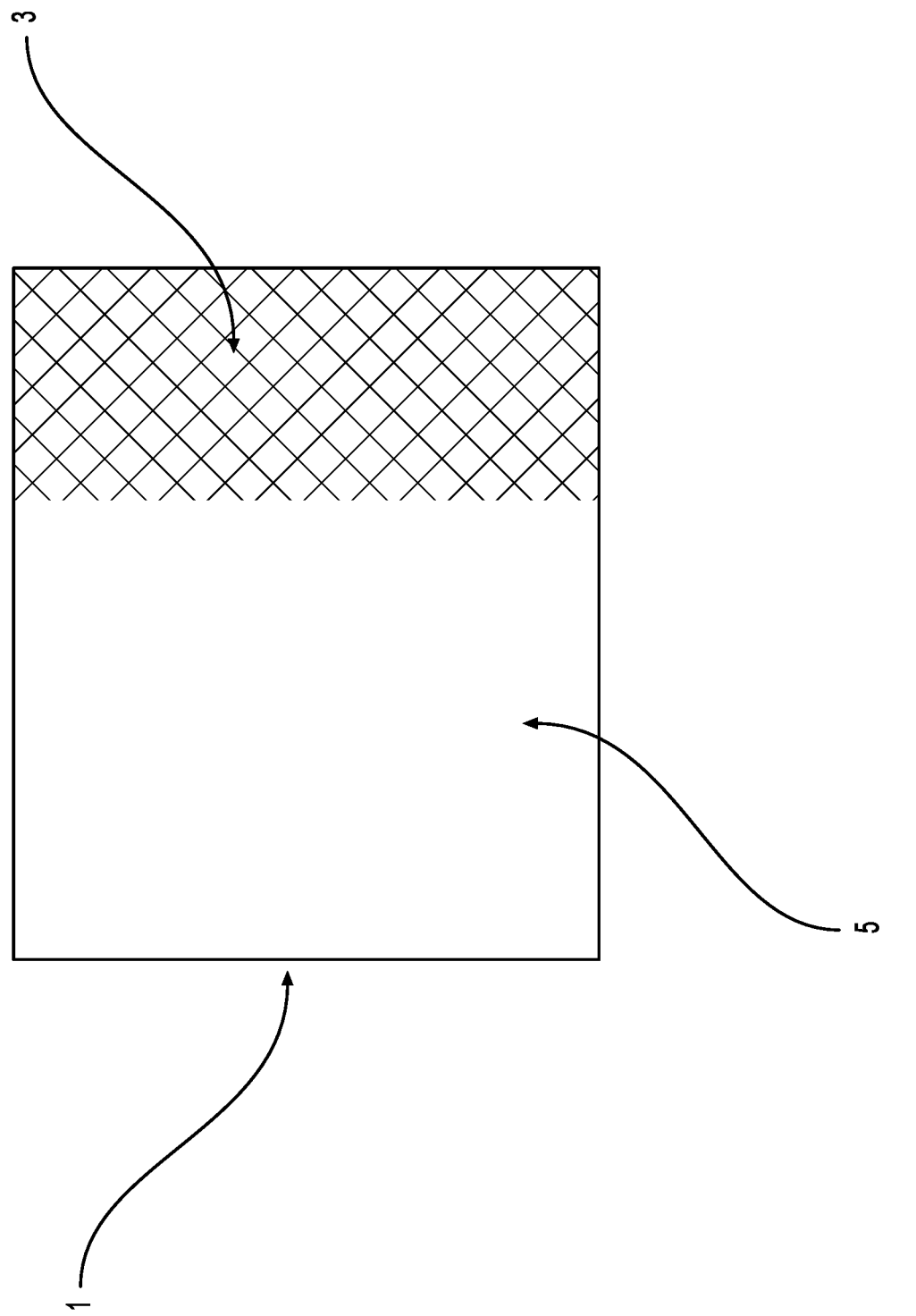
FIG. 1 shows an exemplary target cell.

FIG. 1 shows an exemplary target cell 1. A single target cell 1 can be made of a piezo-pyro-electric crystal or material partially silvered on a first end 3. An EM beam can be directed to strike the silvered surface of the first end such that the beam is partially reflected and partially transmitted into the cell. The reflected component of the beam generates radiation pressure on the cell, leading to a force acting upon the cell that induces a first electric current. At least some of the transmitted component of the beam is absorbed by the cell, leading to heat generation within the cell that induces a second electric current. By measuring the first and second electric currents, one can calculate the power and irradiance of the EM beam. Utilizing both PZT and PRT materials increases measurement accuracy, although alternative embodiments may utilize either PZT or PRT materials alone.

Figure 2:
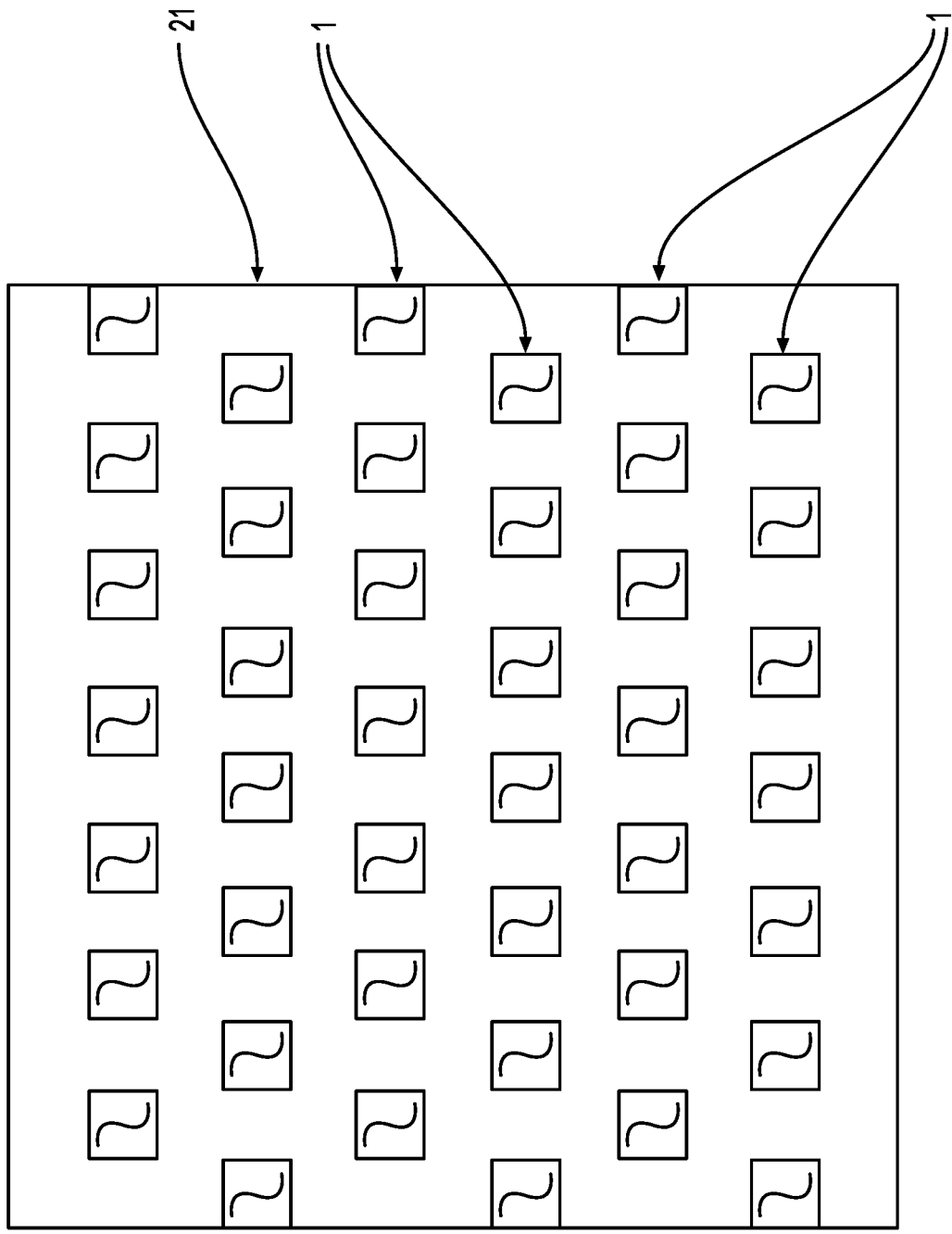
FIG. 2 shows an exemplary target board.

FIG. 2 shows a front view of an exemplary target board 21. A target board 21 includes a plurality of target cells 1. Each target cell 1 can be used to calculate the local beam power at that target cell. By utilizing a plurality of target cells, measurements recorded across the target cells can be used to calculate irradiance across the target board. Fluctuations of beam power varying by location (spatial jitter) can be calculated by comparing measurements recorded across target cells. Fluctuations of beam power varying by time (temporal jitter) can be calculated by comparing measurements of each target cell over a period of time. The density of sensors per surface area on a target board can be varied. If the density is too high, too much reflection can occur. If the density is too low, there may not be enough data to provide accurate power and irradiance measurements. In exemplary embodiments, individual elements should be as close as possible to ensure accurate measurements. In exemplary embodiments, a target board 21 can have differing densities of target cells in various regions of the board (e.g., highest density in the center and lowest density in the outermost region). The size of individual target cells can vary. In exemplary embodiments, a target board can have different sized target cells in various regions of the board (e.g., smaller target cells in the center and larger target cells in the outermost region). The target board should be constructed of a material capable of diffusing incoming EMR and tolerating high temperatures.

Figure 3:
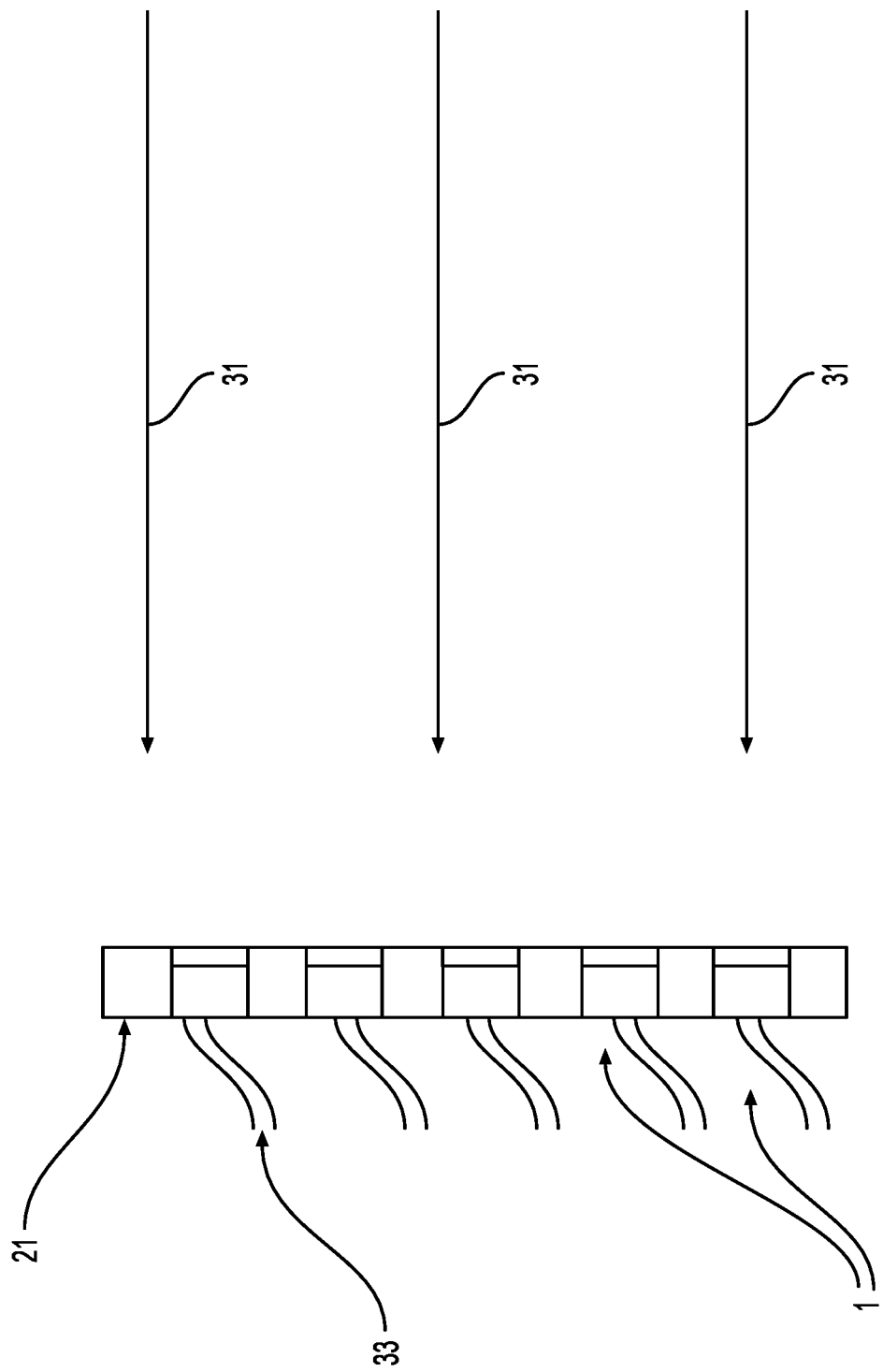
FIG. 3 shows a profile view of an exemplary target board.

FIG. 3 shows a profile view of an exemplary target board 21. Each target cell 1 is wired 33 to electrically couple the target cell 1 to a processor such that electric currents induced in the target cells can be measured and recorded. By directing the EM beam 31 to strike the target board at an oblique angle, the reflected component of the EM beam 31 can be reused or sent to a specific target (e.g., a test bed, a beam dump, etc.).

Figure 4:
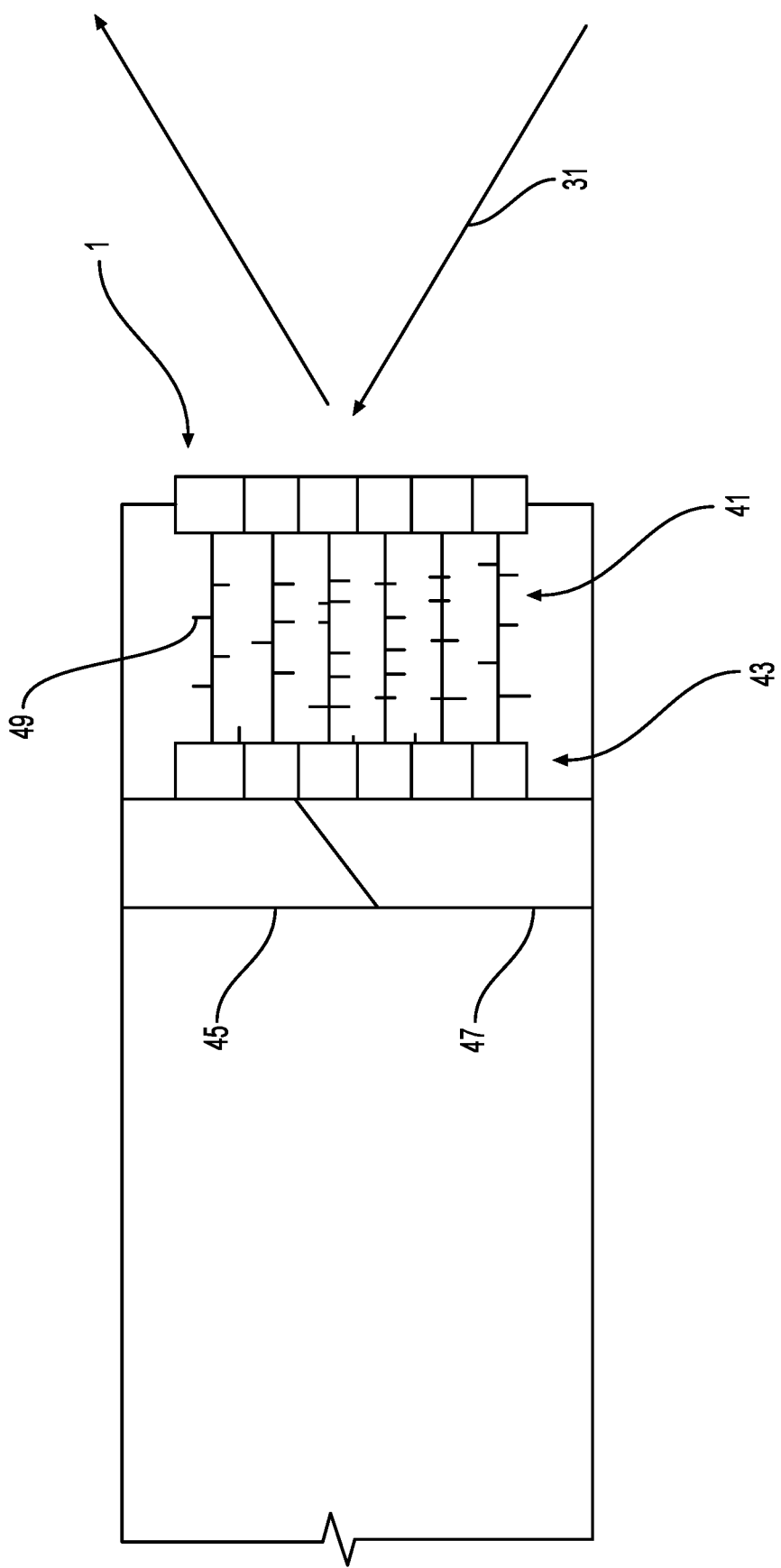
FIG. 4 shows a profile view of an exemplary system.

FIG. 4 shows a profile view of an exemplary target board system. Each target cell 1 is coupled to a force member 41. This embodiment can be used in high temperature operating environments where components of the system are vulnerable to heat damage. Additional space between adjacent force members allows heat to dissipate. A plurality of fins 49 can be coupled to each force member 41 to dissipate additional heat. A plurality of PZT and PRT cells 43 measure force from force members 41 and heat transferred from the target cells. By converting force into electricity, PZT materials can reduce the amount of vibration within the system for more accurate measurements. A heat sink can be placed between each force member and target cell 1 to help transfer heat away from the target cells 1. An input/output (I/O) system 45 can transfer data to an external source.

Figure 5:
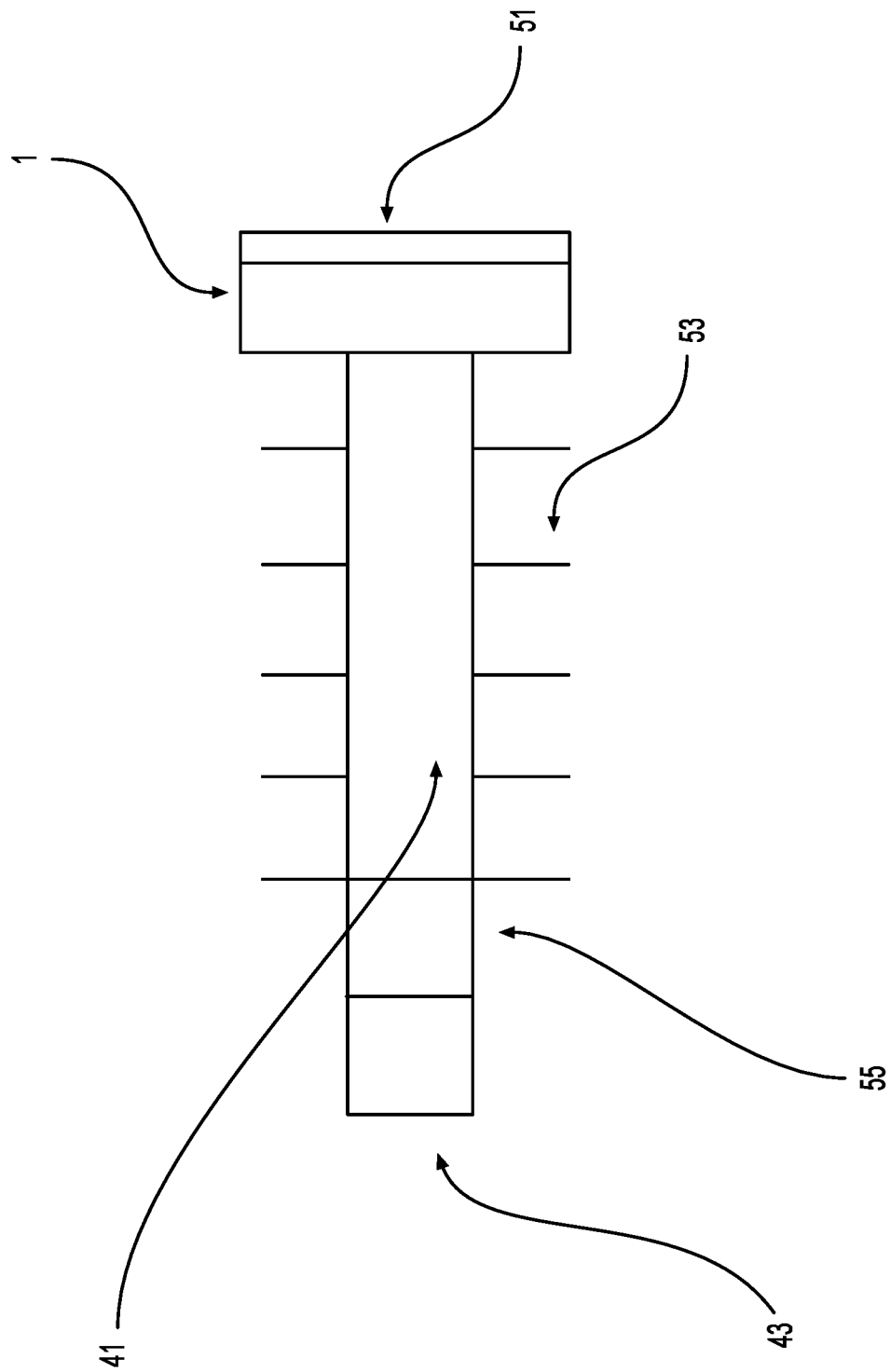
FIG. 5 shows an exemplary force member setup.

FIG. 5 shows an exemplary force member 41 and mirror section 51. Force member 41 couples to target cell 1 and sensor cells 43. A mirror coating 53 can be applied to target cell 1, or a mirror can be embedded within the cell. A plurality of fins 53 help dissipate heat. An insulating layer 55 can reduce the amount of heat reaching cells 43.

Figure 6:
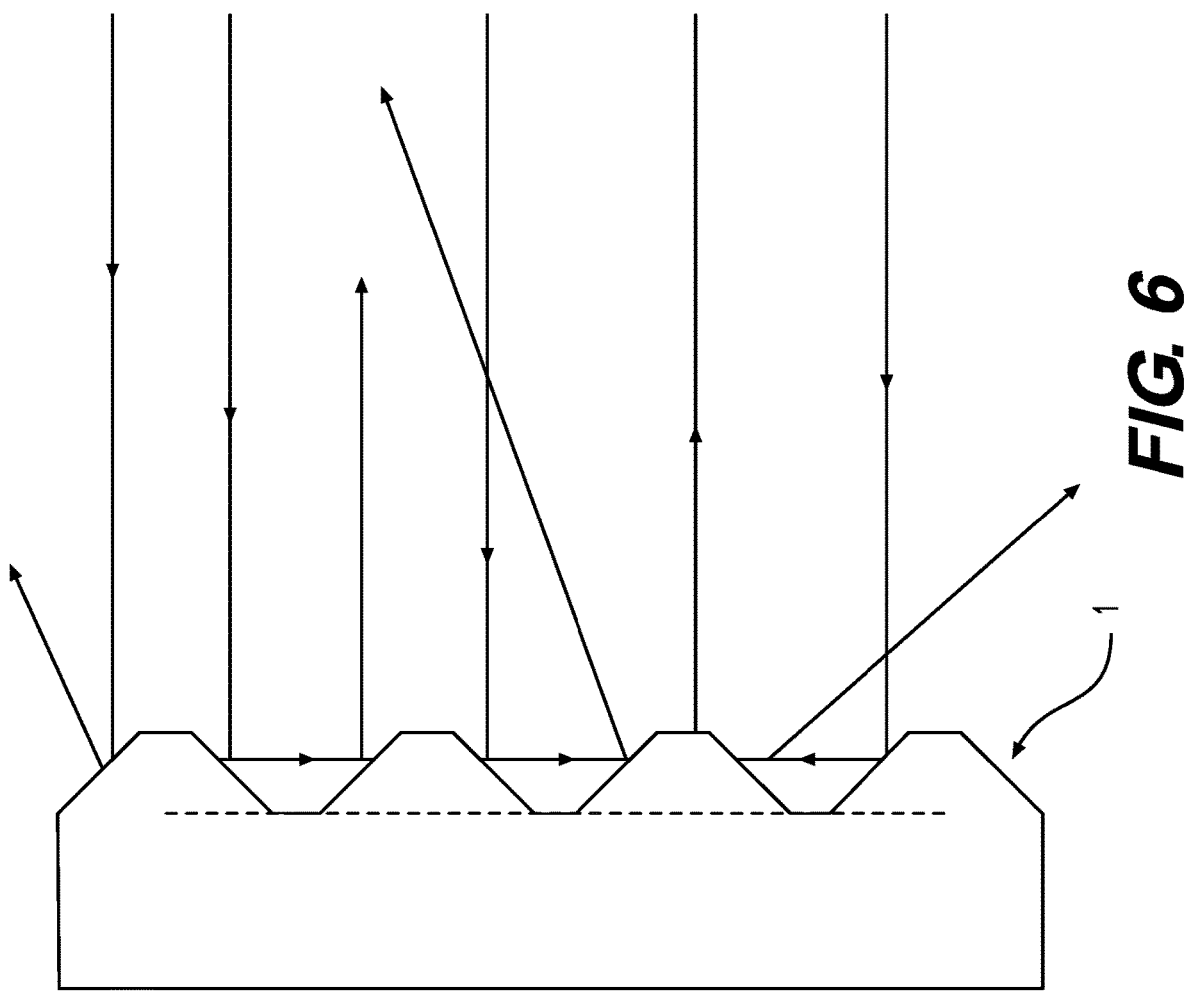

FIG. 6 shows an exemplary mirror section of target cell 1 used for diffusive reflectance. In this embodiment, an EM source is directed towards a target board such that the EM beam is perpendicular to the target board. Each reflective surface has a plurality of flat surfaces and a plurality of angled surfaces. A first portion of the EM beam reflects off the plurality of flat surfaces such that the first portion of the EM beam reflects at a 90° angle back towards the EM source. The second portion of the EM beam reflects off the plurality of angled surfaces such that the second portion of the EM beam is scattered into the environment without being concentrated. This embodiment can be used to improve operator safety when the EM beam does not need to be used after reflecting. An additional sensor can be placed on or near the EM source to measure and record the first portion of the EM beam to improve the accuracy of the system.

FIG. 7 shows an exemplary mirror section of target cell 1 used for diffusive reflectance. In this embodiment, an EM source is directed towards a target board such that the EM beam is perpendicular to the target board. Each reflective surface is treated such that the surfaces will randomly reflect EMR. This embodiment can be used to improve operator safety when the EM beam does not need to be used after reflecting.

Although the invention has been described in detail with reference to certain preferred embodiments, variations and modifications exist within the spirit and scope of the invention as described and defined in the following claims.

The invention claimed is:

1. An electromagnetic radiation (EMR) measurement system comprising:
    a plurality of target cells each comprising a first section comprising a piezoelectric material and a pyroelectric material and a second section comprising a reflective material;
    a processor electrically coupled to each target cell of the plurality of target cells;
    wherein EMR reflecting off the plurality of target cells creates radiation pressure upon the plurality of targets cells, wherein the radiation pressure induces a first portion of an electric current within the plurality of target cells;
    wherein EMR absorbed by the plurality of target cells induces a second portion of the electric current within the plurality of target cells;
    wherein the processor receives the first and second portions of the electric current.

2. The system of claim 1, each target cell further comprising a force member disposed between the first and second sections.

3. The system of claim 2, each target cell further comprising a plurality of fins disposed along the force member.

4. The system of claim 2, each target cell further comprising a hint sink disposed between the force member and the second section.

5. The system of claim 2, each target cell further comprising an insulation section between the force member and the first section.

6. An electromagnetic radiation (EMR) measurement system comprising:
    a plurality of target cells each comprising a first section comprising a piezoelectric material and a second section comprising a reflective material;
    wherein EMR reflecting off the plurality of target cells creates radiation pressure upon the plurality of targets cells, wherein the radiation pressure induces a first portion of an electric current within the plurality of target cells;
    wherein EMR absorbed by the plurality of target cells induces a second portion of the electric current within the plurality of target cells.

7. The system of claim 6, each target cell further comprising a force member disposed between the first and second sections.

8. The system of claim 7, each target cell further comprising a plurality of fins disposed along the force member.

9. The system of claim 7, each target cell further comprising a hint sink disposed between the force member and the second section.

10. The system of claim 7, each target cell further comprising an insulation section between the force member and the first section.

11. The system of claim 6, further comprising a processor electrically coupled to each target cell of the plurality of target cells, wherein the processor receives the first portion of the electric current.

* * * * *